US00H002178H

(19) United States

(12) Statutory Invention Registration

Rivera et al.

(10) Reg. No.: US H2178 H

(43) Published: Feb. 6, 2007

(54) BI-LEVEL DUAL HOISTING CONTAINER TRANSPORT CRANE

(75) Inventors: Rafael Rivera, Magnolia, NJ (US); Christopher Clemmer, Allentown, PA (US)

(73) Assignee: The United States of America as represented by the Secretary of the Navy, Washington, DC (US)

(21) Appl. No.: 10/650,678

(22) Filed: Aug. 29, 2003

(51) Int. Cl.
*B66C 17/00* (2006.01)

(52) U.S. Cl. ..... 212/316; 212/318; 141/140.3; 141/141.3

(58) Field of Classification Search ..... 414/139.4, 414/139.9, 140.3, 141.3, 141.4, 561; 212/316, 212/318; 104/107
See application file for complete search history.

(56) References Cited

U.S. PATENT DOCUMENTS

| | | | | | |
|---|---|---|---|---|---|
| 731,231 | A | * | 6/1903 | Seaver et al. | 212/198 |
| 853,484 | A | * | 5/1907 | Taylor | 212/316 |
| 3,630,390 | A | * | 12/1971 | Tax et al. | 414/140.3 |
| 3,881,608 | A | * | 5/1975 | Hupkes | 414/141.3 |
| 3,945,503 | A | * | 3/1976 | Cooper | 212/274 |
| 4,360,110 | A | * | 11/1982 | Sigman et al. | 212/318 |
| 4,599,027 | A | * | 7/1986 | Knapp | 414/137.1 |
| 4,858,775 | A | * | 8/1989 | Crouch | 212/312 |
| 4,883,184 | A | * | 11/1989 | Albus | 212/274 |
| 5,238,346 | A | * | 8/1993 | Grathoff | 414/140.7 |
| 5,320,471 | A | * | 6/1994 | Grathoff | 414/140.9 |
| 5,489,033 | A | * | 2/1996 | Luebke | 212/318 |
| 5,570,986 | A | * | 11/1996 | Hasegawa et al. | 414/140.3 |
| 5,775,866 | A | * | 7/1998 | Tax et al. | 414/140.3 |
| 6,530,492 | B2 | * | 3/2003 | Weis | 212/316 |
| 2002/0031419 | A1 | * | 3/2002 | Weis | 414/140.3 |

FOREIGN PATENT DOCUMENTS

| | | | |
|---|---|---|---|
| WO | WO 94/16978 | * | 8/1994 |
| WO | WO 98/35905 | * | 8/1998 |

* cited by examiner

*Primary Examiner*—M. Clement
(74) *Attorney, Agent, or Firm*—Jacob Shuster

(57) ABSTRACT

Containers are transported by movement of upper and lower trolleys along vertically spaced travel paths established by laterally spaced rails formed in a boom supported in a horizontal position by suspension cables attached to a frame assembly through which the boom extends horizontally between container receiving and delivery locations.

5 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
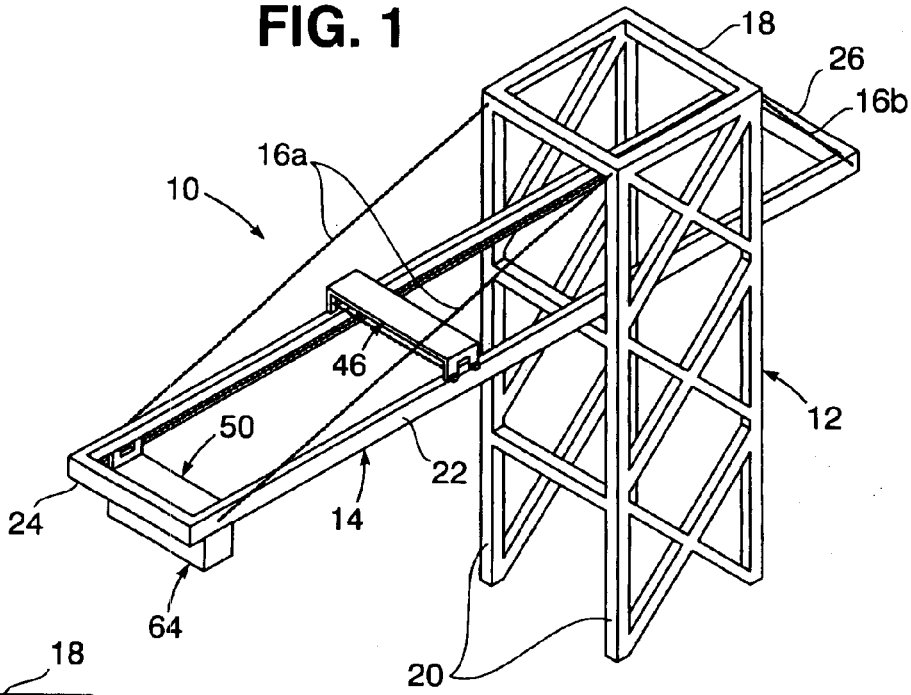
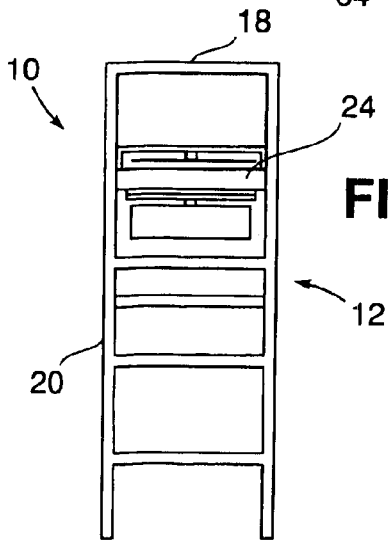
FIG. 2
FIG. 3
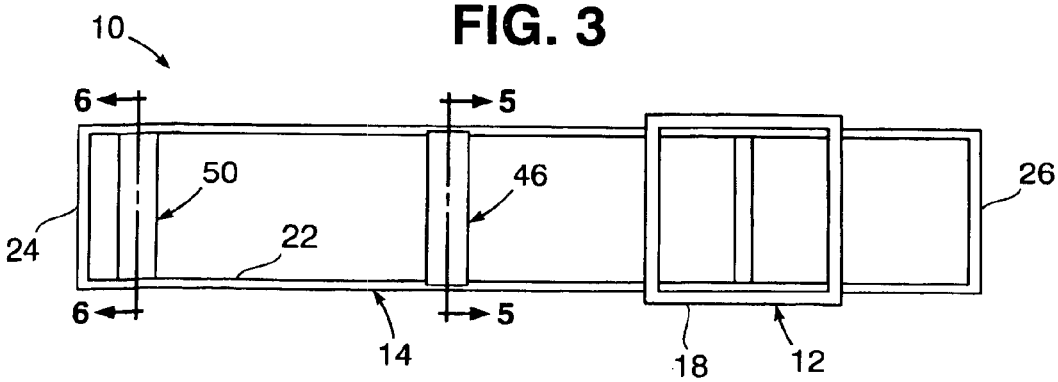

BI-LEVEL DUAL HOISTING CONTAINER TRANSPORT CRANE

STATEMENT OF GOVERNMENT INTEREST

The invention described herein may be manufactured and used by or for the Government of the United States of America for governmental purposes without the payment of any royalties thereon or therefore.

The present invention relates to guided transport of containers between adjacent locations, such as land-based trucks and dockside moored sea vessels.

BACKGROUND OF THE INVENTION

Current methods and apparatus for transport of containers between ships at port and land-based dockside locations involve use of typical marine terminal cranes having a single rail guided trolleys on a boom extending between such container receiving and delivery locations. Such container transport cranes have facilities involving factors which limit transport rapidity and efficiency with respect to containers. It is therefore an important object of the present invention to provide for more efficient container crane loading and unloading of sea vessels to avoid port traffic delays.

SUMMARY OF THE INVENTION

Pursuant to the present invention, containers are loaded onto and removed from two trolleys of a single crane to double the rate of container transfer. Such trolleys are respectively guided along upper and lower travel paths vertically spaced from each other along a horizontal crane boom suspended by cables anchored to the upper end of the crane support frame that is positioned by motorized wheel assemblies between container receiving and delivery locations on a land-based surface. Each of such travel paths is established by a pair of rails laterally spaced from each other on the boom positioned so as to extend between the container receiving and delivery locations, at which such as a land-based truck vehicle and a dockside shipping sea vessel are positioned. The vertical spacing between travel paths and the lateral spacing between the boom rails accommodate handling of many containers to be loaded and unloaded without obstruction or delay in transport.

BRIEF DESCRIPTION OF DRAWING

A more complete appreciation of the invention and many of its attendant advantages will be readily appreciated as the same becomes better understood by reference to the following detailed description when considered in connection with the accompanying drawing wherein:

FIG. 1 is a perspective view of a container transport crane constructed in accordance with one embodiment of the present invention;

FIG. 2 is an end view of the crane shown in FIG. 1, as viewed from a container receiving or delivery location;

FIG. 3 is top plan view of the crane shown in FIG. 1;

DETAILED DESCRIPTION OF PREFERRED EMBODIMENTS

Figure 4:
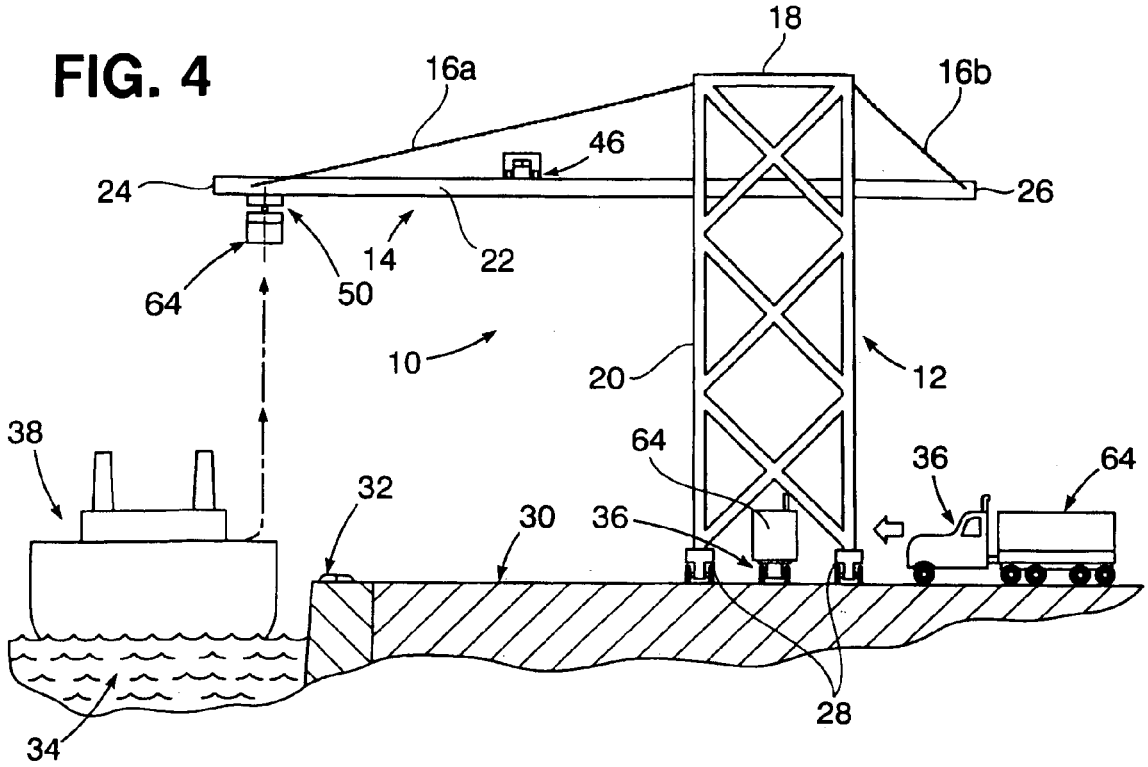
FIG. 4 is a side elevation view of the crane illustrated in FIGS. 1–3, positioned between typical container receiving and delivery locations.

Referring now to the drawing in detail, FIGS. 1, 2 and 3 illustrate a container transfer crane generally referred to by reference numeral 10. Such crane 10 includes a vertical support frame 12 to which a horizontal boom 14 is connected by pairs of cables 16*a* and 16*b*. Such cables 16 are fixedly anchored to an upper rectangular end portion 18 of the support frame 12, having four vertical gantry legs 20 extending downwardly therefrom. The boom 14 includes a pair of rails 22 interconnected in laterally spaced relation to each other at their forward and rear ends by end connectors 24 and 26. The frame anchored cables 16*a* and 16*b* are connected to the rails 22 adjacent to their forward and rear ends so that the boom 14 is supported in a horizontal position extending through the upper end portion of the support frame 12 in contact with the gantry legs 20.

The crane 10 is moved to a position on a land-based surface as shown in FIG. 4 by motorized wheel assemblies 28 at the bottom of the gantry legs 20, between a land-based delivery location and a dockside location 32 along a body of seawater 34. The crane 10 is moved to such position by the motorized wheel assemblies 28 so as to transfer containers between delivery vehicle trucks 36 and a shipping sea vessel 38 located in the seawater 34 at the dockside receiving location 32. Container loads are thereby readily transferred by means of the crane 10 between the delivery vehicle trucks 36 respectively moved to positions between the crane legs 20 and the receiving shipping vessel 38 as hereinafter explained.

Figure 5:
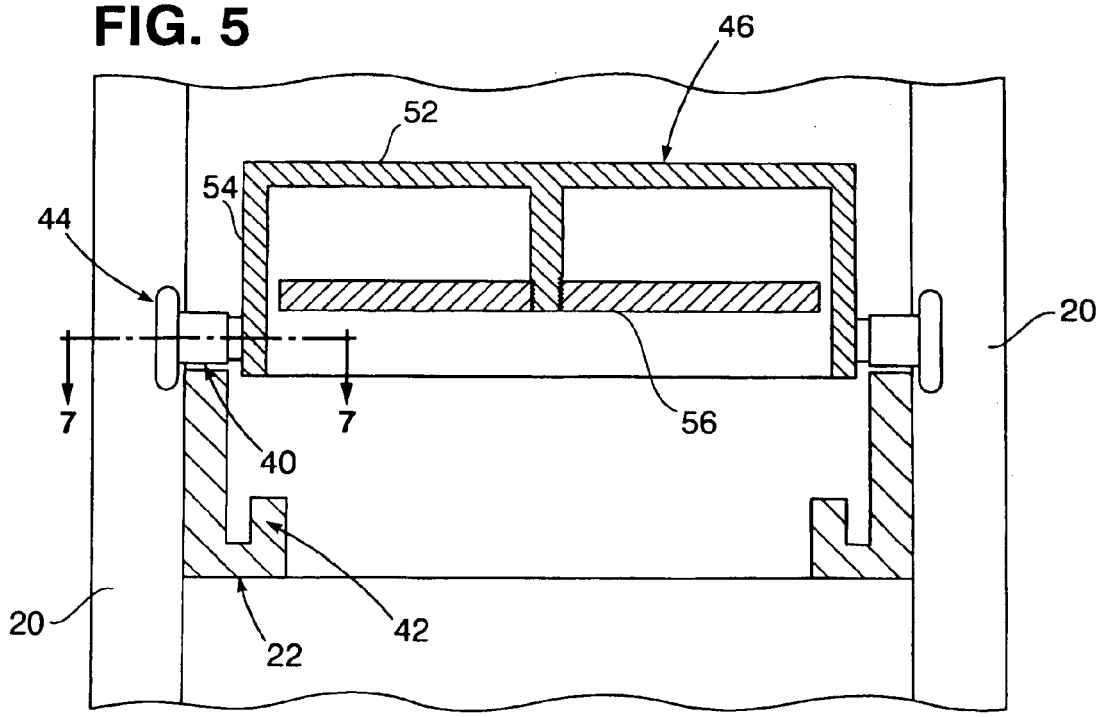
FIGS. 5 and 6 are partial sections views respectively taken substantially through section lines 5—5 and 6—6 in FIG. 3.
Figure 6:
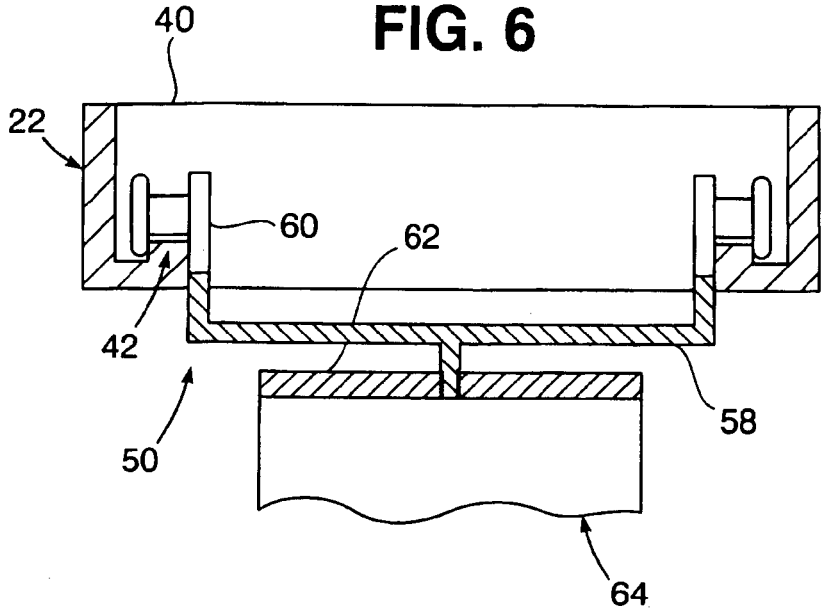
Figure 7:
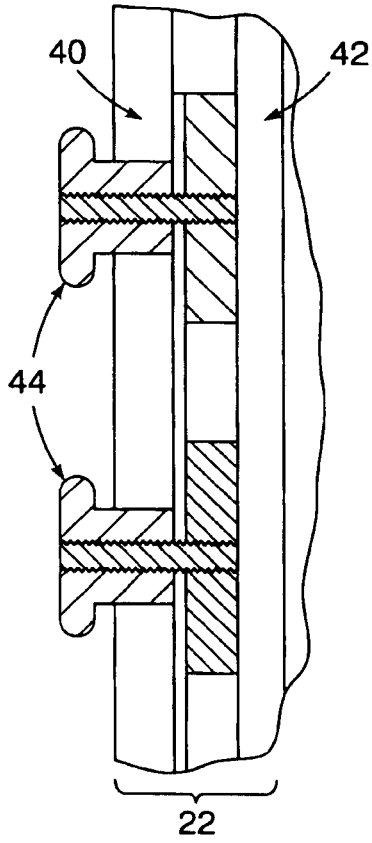
FIG. 7 is a partial section view substantially taken through section line 7—7 in FIG. 5.

The rails 22 of the boom 14 as shown in FIGS. 5, 6 and 7 have upper rail tracks 40 formed in the top edges thereof, while confronting lower trolley rail tracks 42 are formed in the lower inside portions sides of the rails 22 adjacent the bottom thereof. The upper rail tracks 40 receive wheels 44 of an upper trolley 46, as shown in FIGS. 1, 3, 4 and 5, while the lower rail tracks 42 receive wheels 60 of a lower trolley 50 as shown in FIG. 6. The upper and lower trolleys 46 and 50 are thereby readily displaceable longitudinally along the boom 14 between the opposite end connectors 24 and 26 at the vertically spaced levels of the upper and lower rail tracks 40 and 42.

Pivotally suspended from a cross-bar portion 52 of the upper trolley 46 between its side portion 54 on which the wheels 44 are mounted as shown in FIG. 5, is a spreader element 56. Loaded containers are adapted to be attached to such spreader 56 for transport by the upper trolley 46 along an upper travel path on the boom 14 between its opposite ends and for pivotal displacement relative thereto for enhancing reception and delivery. The lower trolley 50 is also provided with a cross-bar portion 58 between side portions on which the wheels 60 are mounted as shown in FIG. 6. A spreader element 62 is pivotally suspended from the cross-bar portion 58 of the lower trolley 50 for reception, delivery and transport of a loaded container 64 for example, between the opposite ends of the boom 14 along the lower trolley travel path established by the rail track 42.

It will be apparent from the foregoing description that the lateral spacing between the boom rails 22 and corresponding dimensions of the trolleys 46 and 50 at different vertically spaced levels enables transport of all containers without obstruction, as well as to accommodate separate upper and lower rail shuttling movement of the trolleys 46 and 50 at the same time with containers thereon. Such shuttling movement of the upper trolley 46 with the container 64 thereon occurs on the rails 22 along the boom 14 as viewed in FIG. 1 to pass over the lower trolley 50 also moving therebelow along the boom 14.

Thus, both the trolleys 46 and 50 may be utilized with maximum efficiency during a plurality of operational cycles for load transfer in opposite directions along the boom 14. Accordingly, one of trolley 46 and 50 may be receiving a loaded container on its spreader 56 or 62 at one end of the boom 14 from the vehicles 36 as shown in FIG. 4, while the other trolley 46 or 50 at the other end of the boom 14 is positioned for delivery of a loaded container from its spreader 56 or 62 at a ship-side location by drop off of a standard container 64 onto the sea vessel 38 as shown in FIG. 4.

Obviously, other modifications and variations of the present invention may be possible in light of the foregoing teachings. It is therefore to be understood that within the scope of the appended claims the invention may be practiced; otherwise than as specifically described

What is claimed:

1. In a load handling crane for transport of containers between receiving and delivery locations, the improvement residing in: at least two non-pivotal trolleys onto which the containers are positioned; rail means for guiding simultaneous movement of the trolleys between said locations passing each other vertically spaced travel paths to effect said transport of the containers; and wheeled frame means for support of the rail means.

2. The load handling crane as defined in claim 1, wherein said rails means comprises: a boom having a pair of laterally spaced upper rail tracks establishing one of said travel paths and a pair of laterally spaced lower rail tracks establishing the other of the travel paths, said wheeled frame means supporting the boom extending in a horizontal position between said receiving and delivery locations.

3. The load handling crane as defined in claim 2, wherein said wheeled frame means includes: laterally spaced legs having lower and upper ends between which the boom extends; and cable means interconnecting the boom with the upper ends of the legs for suspension of the boom in said horizontal position.

4. The load handling crane as defined in claim 3, including pivotally displaceable spreader means operatively mounted on the non-pivotal trolleys for reception and delivery of the containers at said receiving and delivery locations.

5. The load handling crane as defined in claim 1, including pivotally displaceable spreader means on the non-pivotal trolleys for reception and delivery of the containers at said receiving and delivery locations.

* * * * *